United States Patent
Nebel et al.

(10) Patent No.: US 10,782,229 B1
(45) Date of Patent: Sep. 22, 2020

(54) DETECTING METAL CONTAMINATION IN POLYMER SHEETS

(71) Applicant: HONEYWELL INTERNATIONAL INC., Morris Plains, NJ (US)

(72) Inventors: Tobias Nebel, North Vancouver (CA); Michael Kon Yew Hughes, North Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/353,262

(22) Filed: Mar. 14, 2019

(51) Int. Cl.
  *G01N 21/3586* (2014.01)
  *G01N 21/3563* (2014.01)

(52) U.S. Cl.
  CPC ..... *G01N 21/3586* (2013.01); *G01N 21/3563* (2013.01); *G01N 2201/104* (2013.01)

(58) Field of Classification Search
  CPC ............... G01N 21/3586; G01N 21/94; G01N 2201/104
  See application file for complete search history.

(56) References Cited

U.S. PATENT DOCUMENTS

| | | | |
|---|---|---|---|
| 2010/0235114 A1* | 9/2010 | Levy | G01N 21/9505 702/40 |
| 2016/0093539 A1* | 3/2016 | Nakanishi | H01L 21/26 250/341.4 |
| 2016/0245703 A1* | 8/2016 | Takase | G01J 11/00 |
| 2017/0102231 A1* | 4/2017 | Yahng | G01B 11/24 |

OTHER PUBLICATIONS

S. Wietzke,"Terahertz Spectroscopy" 2010 IEEE (Year: 2010).*
S. Wietzke, "Industrial applications of THz systems", 2009 SPIE (Year: 2009).*
Christian Jördens,"Detection of foreign bodies in chocolate with pulsed terahertz spectroscopy" 2008 Optical Engineering (Year: 2008).*
Christian Jansen, "Terahertz imaging: applications and perspectives", 2010 Applied Optics (Year: 2010).*
Cheng-Wu You, "Method for defect contour extraction in terahertz non-destructive testing conducted with a raster-scan THz imaging system"2018 IEEE (Year: 2018).*
Nbsp;Hong Xiao, "R-P CNN method to rapidly detect objects on THz images in human body security checks", Jun. 2018, Applied Optics (Year: 2018).*
Industrial applications of THz systems, Article in Proceedings of SPIE—The International Society for Optical Engineering—Jul. 2009, 14 pages.
Luna Inc., "T-Gauge Sensor Configuration," TeraMetrix-Terahertz Solutions, 2019, 2 pages, Luna, Roanoke, Virginia, USA.

* cited by examiner

*Primary Examiner* — Maurice C Smith

(57) ABSTRACT

A sheet material measurement system includes an optical system for identifying at least a first area of a moving sheet material suspected of including at least one defect. A terahertz (THz) system includes a THz generator for generating a THz beam and a THz detector and a scanner including a scanner head for positioning the THz system over the first area. A computing device is coupled to receive signals sensed by the THz detector after interacting with the first area. The computing device determines whether the first area is a metal-contaminated area including metal particles.

14 Claims, 2 Drawing Sheets

DETECTING METAL CONTAMINATION IN POLYMER SHEETS

FIELD

Disclosed embodiments relate to metal detection in polymer sheets.

BACKGROUND

Polymer film manufacturers, such as manufacturers of lithium (Li)-ion battery (LIB) separator membranes, need to ensure their product is free of defects, and in particular, free of metal particle contamination. A traditional battery separator is an electrically insulating (dielectric) layer with a porous structure comprising inert polymers such as polypropylene (PP) or polyethylene (PE) positioned between an anode and a cathode. The primary function of the separator is to prevent physical and electrical contact between the anode and the cathode, while facilitating ion transport in the LIB cell.

In the case of LIB separators it is important to be at least essentially free of metals for the performance and the safety of the LIB, avoiding for example metal induced short-circuits during operation between the anode and cathode. This requirement also extends to the producers of the batteries themselves. State of the art optical systems are generally able to identify defects in a polymer film including identifying particles, but cannot identify whether such a defect is metallic defect, and thus whether or not the defect needs to be removed.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize being able to identify metallic particles in sheet materials such as polymer sheets such as for LIB separator membranes rather than just identifying all defects such as particles is helpful because while all defects in a film can cause problem(s), metallic particles are generally only a small fraction of all contaminant particles. Moreover, it is generally expensive to remove (e.g., cut out) areas from a sheet material (e.g., a LIB separator membrane) and therefore, economically it makes sense to be able to remove only the areas of the sheet material that are confirmed to actually include metal particles. If area(s) of the sheet material are identified as a metal-contaminated area(s) having metal particle(s), whether magnetic or non-magnetic metals, the metal-contaminated area can be removed by a known removal system that cuts out the metal-contaminated areas, whether on the surface of the sheet material or even if the metal-contaminated areas are embedded (e.g., in pores) in the sheet material.

One disclosed embodiment comprises a material measurement system comprising an optical system for identifying at least a first area of a moving sheet material suspected of including at least one defect; and a terahertz (THz) system including a THz generator for generating a THz beam, and a THz detector. A scanner is for positioning the THz system over the first area of the sheet material, and a computing device is coupled to receive signals sensed by the THz detector. The computing device determines whether the first area is a metal contaminated area having metal particles. Disclosed material measurement systems provide a solution for the full area of the sheet material (at conventional line speeds) as well as providing enough resolution to identify the presence of metal particles ≥500 μm size, or smaller. The information about detected metal particles can then be used by a system including a cutter that is configured to cut out and discard the metal-contaminated areas, then patch the cut out areas with non-contaminated (clean) sheet material.

DETAILED DESCRIPTION

Figure 1:
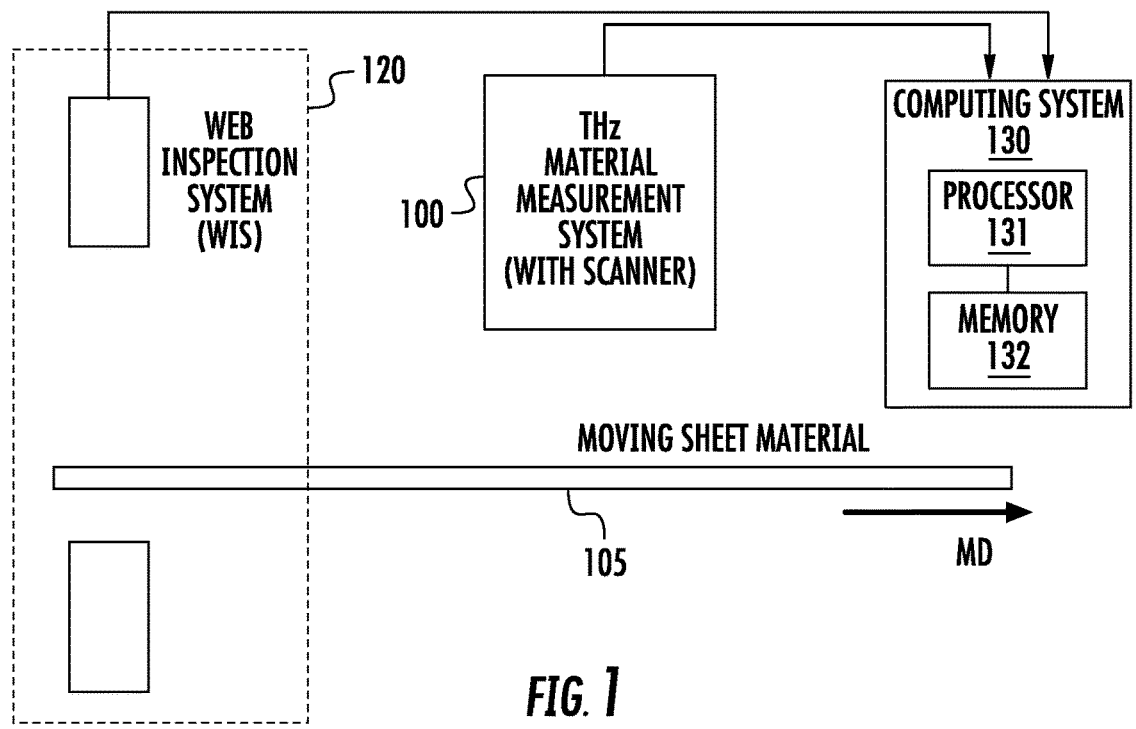
FIG. 1 depicts an example scanner with a THz system positioned downstream from a web inspection system (WIS) that first identifies area(s) in a moving sheet material having defects, wherein the THz system determines whether the identified area(s) are metal-contaminated areas, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

FIG. 1 depicts an example THz material measurement system 100 with a scanner positioned downstream from a WIS 120 that first identifies defects and their area positions in a moving sheet material 105, with the sheet material 105 shown moving in the machine-direction (MD). The defects can include particles or holes. The scanner associated with the THz material measurement system 100 conventionally moves the system in the cross direction (CD), while the sheet material generally moves in the machine direction (MD). The THz material measurement system 100 determines whether the identified area(s) include metal-contaminated area(s) having metal particles.

The primary function of the WIS 120 is to locate and classify the defects present in the sheet material 105, and provide the defect area location(s). Defects in the sheet material 105 such as holes generally need to be identified to enable them to be removed. Defects such as markings due to an off-speed roller may be acceptable. Similarly, the particles identified by the WIS 120 may be identified with concentrations high enough that removing them all causes unacceptable costs. Small, non-electrically conductive particles can be left in the sheet material 105 and will generally not cause problems for a separator membrane of a LIB. Electrically conductive particles of any size should generally not be used for a separator membrane of a LIB. There may also be other particles in a low concentration which appear as metal particles to the THz scanner but are not metal particles. However, for safety reasons these false metal particles should also be removed as well.

The sheet material 105 can generally be any sheet material that has a low absorption for THz. It is recognized herein that polymers are generally transparent to THz radiation, and essentially all metals are not transparent (have a high reflection) to THz radiation. The sheet material 105 in the case of a LIB separator membrane can comprise a polymeric microporous membrane material having a porosity of at least 20%. Typical commercial separators for LIB cells have a porosity of about 40 percent.

The WIS 120 generally provides full sheet material coverage and is generally a non-scanning system. The THz material measurement system 100 and WIS 120 are both communicably coupled to a computing system 130 that comprises a processor 131 having an associated memory 132, such as being wirelessly coupled or more typically coupled over an Ethernet connection. The processor 131 can comprise a digital signal processor (DSP), a microcontroller, an application specific integrated circuit (ASIC), a general processor, or any other combination of one or more integrated processing devices.

The THz material measurement system 100 being downstream from the WIS 120 identifies whether any of the identified defect areas in the sheet material 105 by the WIS 120 have metal particles that enables a cutting and patching system (not shown) that has the metal-contaminated area information to selectively remove the defect areas of the sheet material 105 including when they are metal-contaminated areas, and then replace them with clean (non-contaminated) sheet material. One generally does not care about the concentration of metal particles, as it is desired to generally only remove essentially all the metal particles. As noted above, the optically identifying implemented by the WIS 120 generally utilizes a non-scanning optical inspection system, where the directing of the THz beam comprises using a scanner head (see the scanner head 255 in FIG. 2A) included with a THz system 100 that is dispatched to the suspected area(s).

The THz material measurement system 100 can implement THz time-domain spectroscopy (THz-TDS) by probing the sheet material 105 with pulses of THz radiation, typically with a pulse width of between 100 fs and a 2 ns. If the pulse width is wider one can provide a faster THz scan. The THz material measurement system 100 can also be a continuous wave (CW) system.

The THz material measurement system 100 includes a THz generator 210 (or 'THz source') that provides THz radiation that has sufficient resolution to identify sub-millimeter metal particles (e.g., a size ≤0.5 mm=500 μm). The THz generator 210 generates electromagnetic radiation in the frequency range of 0.1 THz to 10 THz, and in one embodiment, comprises a pulsed laser system that directs intense laser pulses onto an electrically biased photoconductive antenna. The THz region is sometimes also referred to as the far-infrared or the sub-millimeter region, and lies between the infrared (IR) region and the microwave region of the electromagnetic spectrum. It is also possible to generate THz beams with other methods such as nonlinear mixing.

The generation of THz beams is known. In a reflection-based THz system shown as THz material measurement system 200 in FIG. 2A or a transmission-based THz system shown as THz material measurement system 250 in FIG. 2B, the THz detector 235 is able to register (identify) electrically conductive particles which are opaque to THz radiation and thus measurably block the transmission of the THz radiation. For a reflective system, the electrically conductive particles will appear as bright areas on a dark background, and the reverse is true of systems operating in transmission. The analyzing can comprise analyzing an amplitude or a phase of the transmitted portion for transmission-based systems, or the reflected portion for reflection-based systems. of the THz beam.

Since a THz sensor system generally only offers a limited field of view or area of coverage, another feature that is generally in disclosed systems included a scanner for scanning the THz beam to cover any identified area of the sheet material 105. The scanning of the THz beam output by the THz material measurement system can be provided by a variety of different scanning mechanisms. For example, a fast scanning mirror/lens mount guiding the THz beam across the sheet material, a gimbal mount of the THz generator 210 and/or a detector to scan across the sheet material 105. The primary optical system can be a high-resolution camera-based solution, or can be based on a linear array camera described herein as a WIS 120.

Figure 2A:
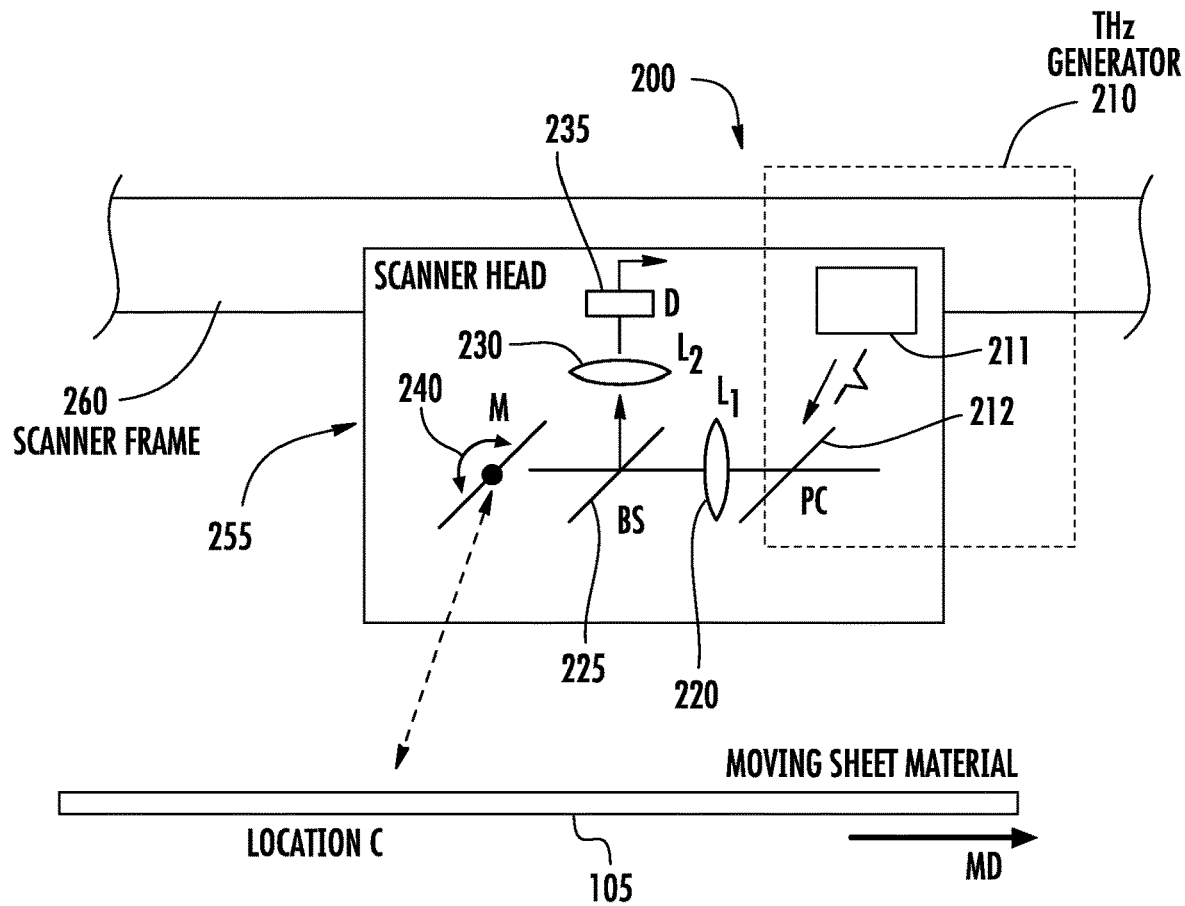
FIG. 2A depicts with a disclosed scanner with a THz system embodied as a reflective sensor, according to an example embodiment.

The THz material measurement system can be mounted on an x-y translation system to be moved to examine each identified area having defects by the WIS 120 or other optical system, travel with the moving sheet 105, and measure the identified area to determine whether the defective area is a metal-contaminated area that has at least one metal. In FIG. 2A described below the THz material measurement system 200 is shown by example within a scanner head 255 that is attached to a scanner frame 260 which is movable by position control signals from computer control (such as by the computing system 130 shown in FIG. 1) to provide an x-y translation system. In this embodiment, the x-y translation system is positioned sufficiently far downstream of the WIS 120 so that the THz material measurement system has enough time to obtain the required spot.

FIG. 2A shows an example THz material measurement system 200 embodied as a reflective system that has all system components on the top side of the sheet material 105. The THz material measurement system 200 is shown including a THz generator 210 comprising a pulsed laser 211 that is incident on an electrically biased photoconductive switch (PC) 212 also known as a photoconductive emitter, where an ultrafast pulse (typically 100 fs or shorter) creates charge carriers (electron-hole pairs) in a semiconductor material and the incident laser pulse abruptly changes the PC 212 from an insulating (dielectric) state into an electrically conductive state. A current flowing through the PC 212 creates the THz pulse. A rapid (typically MHz) repetition of this process creates the THz beam.

The THz beam from the PC 212 is focused by imaging optics shown as lens 1 (L1) 220 that can be a lens or system of lenses which then reaches a beam splitter (BS) 225 with the transmitted beam portion reaching a mirror (M) 240 which can be mounted on a computer controlled galvanometer that controls the angular position of the M 240. The THz beam is shown incident on an area of the sheet material 105 that is shown as location C which has generally been previously identified upstream, such as by the WIS 120 in FIG. 1 termed herein as an identified area, where the scanner head 255 on the scanner frame 260 is dispatched by the system to location C. A reflected pulse is shown by an arrow reflected off location C to M 240 to the BS 225, then to the lens L2 230, and then finally to a THz detector (shown as D) 235, which can also be PC. To perform a 2D scan one generally uses two galvo mounted mirrors.

Figure 2B:
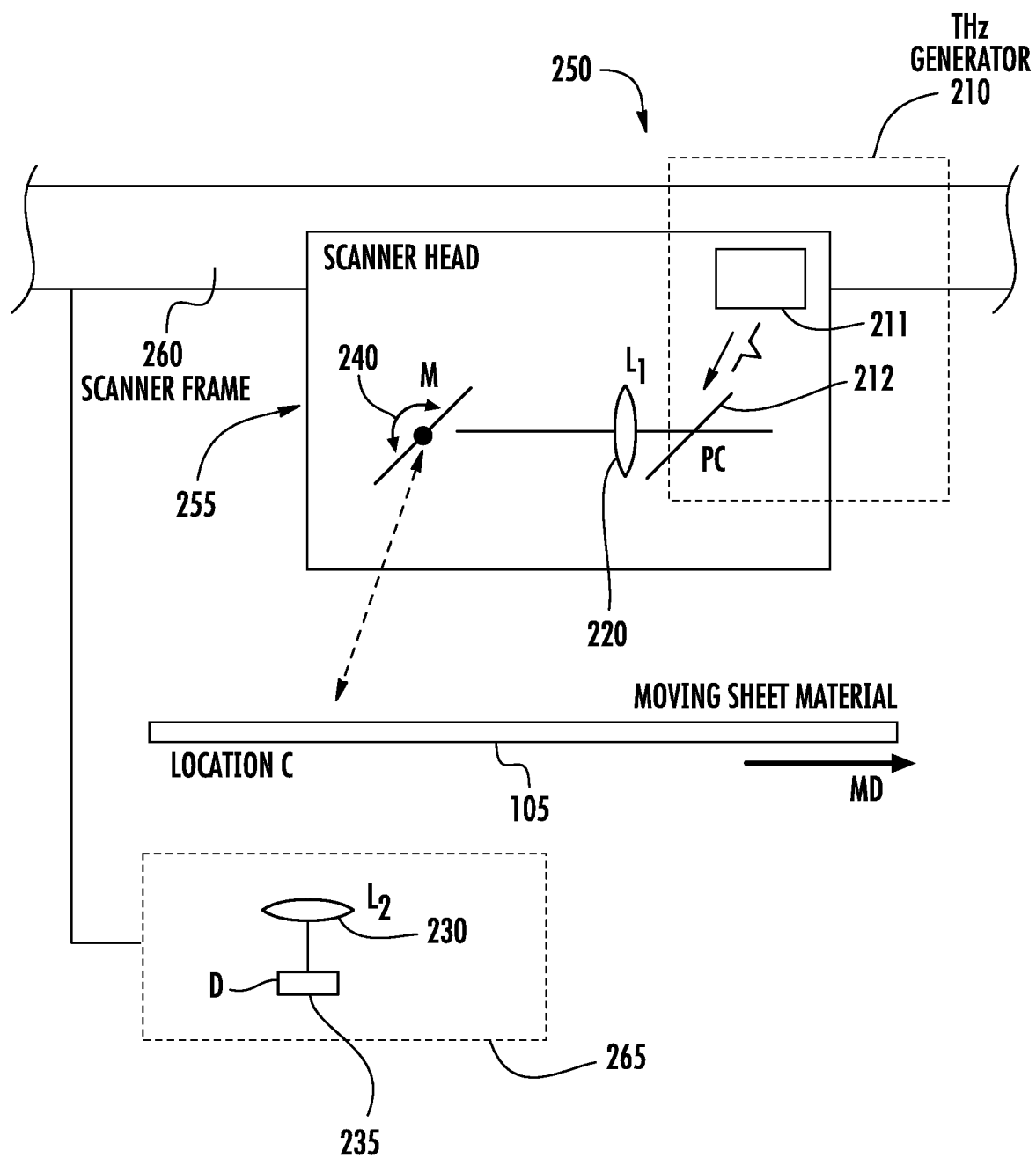
FIG. 2B depicts with a disclosed scanner with a THz system embodied as a transmissive sensor, according to an example embodiment.

FIG. 2B depicts a disclosed scanner with a THz material measurement system 250 embodied as a transmissive sensor, according to an example embodiment. Commercial separators for LIB cells are nominally <30 μm in thickness. There is no BS 225 in the THz material measurement system 250, and the beam portion transmitted through the sheet material 105 is focused by L2 230 and arrives at the THz detector 235 which as noted above can be a PC, that is on a bottom side of the sheet material 105. L2 230 and THz detector 235 are within a scanner head 265, which like scanner head 255 is translated by the scanner frame 260. An embodiment of this transmission configuration is based on either a scanner or an x-y translation stage both of which move the THz-generator head and the THz-detector head in synchronization (or lockstep).

This synchronization can happen mechanically or electronically. The THz generator 210 can either be on the top side or the bottom side of the sheet material positioning the detector 235 at the opposite side of the sheet material 105. For this transmission arrangement, although not shown, one may need a relatively large collection lens on the side opposite the THz source. An xy translation stage may also be used instead of a galvo system. As known in the art a galvo system (or mirror galvanometer) is an electromechanical instrument that precisely deflects a light beam with a mirror positioned by forces generated by electric currents.

The metal-contaminated areas of the sheet material 105 can be kept track of (e.g., in software), and a suitable control system can provide a control output for a defect removal system including a cutter that can cut out the metal-contaminated area(s) of the sheet material 105. The WIS 120 will generally record and store the area location of each defect which needs patching (an absolute MD and CD position).

A defect removal system can cut out and patch such defects with clean (non-contaminated) sheet material before the sheet material is rolled up again. Alternatively, the defect information can be retrieved after the sheet material has been rolled up, then, a defect removal process can also happen in a battery assembly process step where the sheet material is unrolled and cut in patches to be sandwiched between the battery electrode sheets. Here the defect removal machine can be designed and programmed such that it cuts out and discards unwanted MD areas of the sheet material 105 and only passes on good sheet material to the LIB assembly process. Since the sheet material is going to be cut in this process step anyway, an extra patching step can be avoided this way. A cutter may not be an automatic system, but rather a manual system. When the roll of sheet material is being processed, the machine can be programmed to stop at the desired MD location and after cutting a patch can be manually applied at the desired CD position.

Disclosed embodiments can be applied to generally any sheet material. For example, for quality control of battery separator membranes for LIBs. It is recognized that battery manufacturers are generally concerned about the quality of their product and have started to demand 100% coverage by the separator supplier's quality control system. Battery manufacturers may want to implement disclosed quality control measures in their own battery assembly lines. Currently, all known metal detection techniques either do not offer 100% area coverage of the sheet material, do not provide the necessary resolution, or they employ ionizing radiation. While a resolution of 50 nm for x-ray imaging may be known, such equipment that is suited to measure flat sheets is limited to detecting defects down to about 400 μms using ionizing x-ray technology. Disclosed THz-systems are able to cover the entire sheet material in continuous flat sheet production, and detecting defects down to at least about 500 μm without the use of ionizing radiation.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of defect detection, comprising:
optically identifying at least a first area of a moving sheet material suspected of including at least one defect, the sheet material comprises a polymeric microporous membrane material having a porosity of at least 20%;
directing a terahertz (THz) beam onto the first area, and analyzing a transmitted portion or a reflected portion of the THz beam after interacting with the first area to determine whether the first area is a metal-contaminated area containing metal particles.

2. The method of claim 1, wherein the sheet material comprises a lithium (Li)-ion battery (LIB) separator membrane.

3. The method of claim 1, wherein the optically identifying utilizes a non-scanning optical inspection system that is separate from a THz system that provides the THz beam, and wherein the directing of the THz beam comprises using a scanner head including a THz system positioned in the scanner head that is dispatched to the first area.

4. The method of claim 1, wherein the analyzing has a resolution to detect the metal particles when the metal particles have a size of ≤500 μm.

5. The method of claim 1, wherein the analyzing comprises analyzing the transmitted portion of the THz beam after interacting with the first area.

6. The method of claim 1, wherein the analyzing comprises analyzing the reflected portion of the THz beam after interacting with the first area.

7. The method of claim 1, wherein the analyzing comprises analyzing an amplitude or a phase of the transmitted portion or of the reflected portion of the THz beam.

8. A material measurement system, comprising:
an optical system including a camera for obtaining images of a moving sheet material;
a terahertz (THz) system including a THz generator for generating a THz beam and a THz detector;
a scanner including a scanner head for positioning of the THz system, and
a computing device coupled to receive signals sensed by the THZ detector and analyze the images to determine at least a first area of the moving sheet material suspected of including at least one defect, and for directing the scanner head so that the THz beam is incident on the first area,
wherein the computing device is also for analyzing signals sensed by the THz
detector after the THz beam interacts with the first area to determine whether the first area is a metal contaminated area containing metal particles.

9. The material measurement system of claim 8, wherein the optical system comprises a non-scanning optical inspection system.

10. The material measurement system of claim 8, wherein the THz system has a resolution to detect the metal particles when having a size ≤500 μm.

11. The material measurement system of claim 8, wherein the THz system comprises a reflection-based system that includes a beam splitter (BS) between the THz generator and the THz detector.

12. The material measurement system of claim 8, wherein the THz system comprises a transmission-based system.

13. The material measurement system of claim 8, wherein the THz beam is in a frequency range of 0.1 THz to 10 THz.

14. The material measurement system of claim 8, wherein the THz generator comprises a pulsed laser that is incident on an electrically biased photoconductive switch.

\* \* \* \* \*